US011803722B2

(12) United States Patent
De Amorim E Sa Ferreira Andre et al.

(10) Patent No.: US 11,803,722 B2
(45) Date of Patent: Oct. 31, 2023

(54) MULTIPLEXED LUMINESCENT QR CODES FOR SMART LABELLING, FOR MEASURING PHYSICAL PARAMETERS AND REAL-TIME TRACEABILITY AND AUTHENTICATION

(71) Applicant: UNIVERSIDADE DE AVEIRO, Aveiro (PT)

(72) Inventors: Maria Rute De Amorim E Sa Ferreira Andre, Aveiro (PT); Paulo Sergio De Brito Andre, Aveiro (PT); Joao Filipe Candeias Baptista Ramalho, Aveiro (PT); Luis Antonio Martins Ferreira Dias Carlos, Aveiro (PT)

(73) Assignee: UNIVERSIDADE DE AVEIRO, Aveiro (PT)

( * ) Notice: Subject to any disclaimer, the term of this patent is extended or adjusted under 35 U.S.C. 154(b) by 0 days.

(21) Appl. No.: 17/623,933

(22) PCT Filed: Jul. 1, 2020

(86) PCT No.: PCT/IB2020/056223
§ 371 (c)(1),
(2) Date: Dec. 30, 2021

(87) PCT Pub. No.: WO2021/001767
PCT Pub. Date: Jan. 7, 2021

(65) Prior Publication Data
US 2022/0366202 A1 Nov. 17, 2022

(30) Foreign Application Priority Data
Jul. 1, 2019 (PT) .......................... 115622

(51) Int. Cl.
*G06K 19/06* (2006.01)
*C09K 11/06* (2006.01)

(52) U.S. Cl.
CPC ........ *G06K 19/06037* (2013.01); *C09K 11/06* (2013.01); *C09K 2211/182* (2013.01)

(58) Field of Classification Search
CPC .............. G06K 19/06037; C09K 11/06; C09K 2211/182
See application file for complete search history.

(56) References Cited

U.S. PATENT DOCUMENTS

| 5,542,971 A * | 8/1996 | Auslander ........ G06K 19/06018 106/31.15 |
| 2017/0193260 A1* | 7/2017 | Prusik ................ G06K 19/0614 |
| 2020/0193252 A1* | 6/2020 | Guinard ............... G06K 19/145 |

OTHER PUBLICATIONS

Ramalho et al., "[Invited] Luminescent QR codes for smart labelling and sensing", Optics & Laser Technology, 2017, vol. 101, pp. 304-311.
(Continued)

*Primary Examiner* — Laura A Gudorf
(74) *Attorney, Agent, or Firm* — Lucas & Mercanti, LLP

(57) ABSTRACT

The present technology discloses smart labels to monitor physical parameters, and for traceability and authentication of objects, documents or people. This active and multifunctional label is based on spectrally and spatially multiplexed Quick Response (QR) codes (A). Spectrally selectivity is achieved using luminescent materials and spatially multiplexing is achieved using different patterns (B) combining both to design improved QR codes able to store information at different layers of accessibility. This brings advantages over the actual scenario of QR codes wherein the amount of storage information increases up to three times, adding the capability to sense physical parameters and allow to control the provided information, creating public and restricted (Continued)

access. To access and read the content of each layer, different illumination is used (C) to (E) and is processed using a device or via dedicated applications.

9 Claims, 3 Drawing Sheets

(56) References Cited

OTHER PUBLICATIONS

Meruga et al., "Security printing of covert quick response codes using upconverting nanoparticle inks", Nanotechnology, 2012, vol. 23, No. 39, pp. 1-10.
International Search Report and Written Opinion for Corresponding International Application No. PCT/IB2020/056223, 8 Pages, dated Oct. 22, 2020.

* cited by examiner

MULTIPLEXED LUMINESCENT QR CODES FOR SMART LABELLING, FOR MEASURING PHYSICAL PARAMETERS AND REAL-TIME TRACEABILITY AND AUTHENTICATION

CROSS-REFERENCE TO RELATED APPLICATIONS

This application is a 371 of PCT/IB2020/056223, filed Jul. 1, 2020, which claims the benefit of Portuguese Patent Application No. 115622, filed Jul. 1, 2019, each of which are incorporated herein by reference.

TECHNOLOGY FIELD

The present technology discloses smart labels, particularly multiplexed QR codes, to monitor physical parameters, and also for traceability and authentication of objects/documents/people. An extra feature also allows to trace the object course by means of a server connection to provide authentication of the object. All features are built inside one single label, and accessible using a device and/or common camera device without specific features, no extra devices are required.

BACKGROUND ART

Quick Response (QR) codes are a gateway to the Internet of Things (IoT) due to the growing use of smartphones and mobile devices and its intrinsic properties like fast and ease reading, capacity to store more information than that found in conventional codes, e.g. bar codes, and versatility associated to the rapid and simplified access to information. Challenges encompass the enhancement of storage capacity limits and the evolution to a smart label for mobile devices decryption applications.

The prominent advancement in mobile technologies has allowed an ever-closer approach between the user and the access to information, in a more intuitive and simplified way. One of the mechanisms able of promoting this approach is based on the use of Quick Response (QR) codes. A QR code consists of a two-dimensional (2D) matrix composed of white, inactive, and black, active, square modules capable of encoding information and was first presented in 1994 by the Japanese company Denso Wave Incorporated. Since then, QR codes have been sparking interest and visibility among markets and users. The ability to correct errors in damaged zones, the variety of supported coding languages, e.g., numeric, alphanumeric, kanji, kana, the low cost and easy production and the high storage capacity are greater advantages of QR codes, compared with other labels, linear barcodes, RFID, NFC tags. Therefore, it is not surprising that QR codes are now employed in distinct areas of daily life and with different extents, such as anti-counterfeiting and luminescent on-demand tags, (Han, Bae et al. 2012, Kennedy, Stephenson et al. 2017, Burklund, Saturley-Hall et al. 2019, Gmelch, Thomas et al. 2019) industry 4.0, (Fernandez-Carames and Fraga-Lamas 2018) security (authentication of documents for legal, institutional, or other equivalent purposes), (Markman, Javidi et al. 2014, Tkachenko, Puech et al. 2015, Tan, Liu et al. 2018) food science and nutrition, (Sanz-Valero, Sabucedo et al. 2016) and Internet of Things (IoT).(Gligoric, Krco et al. 2019)

With such broad spectrum of applications, in recent years the emphasis has been placed on optimizing and developing the capabilities of QR codes, in order to mitigate their weaknesses. Main challenges encompass the increase of the information storage capacity and the possibility of adding new properties, yielding to active smart labels. Concerning the increase in storage capacity, several methods have been settled.(Victor 2012, André and Ferreira 2014, Galiyawala and Pandya 2014, Ramalho, António et al. 2018) Among those, we highlight color multiplexing methods for which the storage capacity can be enhanced with respect to that of a black/white QR code (e.g. 8 color codes, obtained with the color multiplexing of 3 base codes, can triple the data storage), (André and Ferreira 2014) adding the extra attractive visual effect produced as QR codes become visually more appealing. When luminescent materials are used as inks to print or coat QR codes(Han, Bae et al. 2012, Sangeetha, Lagarde et al. 2013, Diaz, Palleau et al. 2014, Meruga, Baride et al. 2014) novel functionalities may be expected by exploring the sensing characteristics associated to color variation with physical parameters, such as temperature (T). Organic-inorganic hybrids doped with trivalent lanthanide ($Ln^{3+}$) ions(Carlos, Ferreira et al. 2009) combine the pure and tunable emission of the metal center with the processing flexibility of hybrid materials, offering the appropriated properties to design luminescent QR codes. (Ramalho, Antonio et al. 2018) Moreover, several molecular luminescent thermometers based on the temperature dependence of the emission spectra of $Ln^{3+}$ ions embedding into organic-inorganic hybrids have been reported in the past decade.(Brites, Millán et al. 2016, Millán, Carlos et al. 2016, Brites, Balabhadra et al. 2019)

Recently, smartphone-based apparatus in which smartphones are modified with additional components have been used to read luminescent parameters (intensity and lifetime detection) (Mei, Jing et al. 2016, Kennedy, Stephenson et al. 2017, Kim, Jung et al. 2017, Paterson, Raja et al. 2017, Pan, Cao et al. 2018, Zhu 2019) and to generate persistent luminescence, through their white-emitting LEDs coupled to the smartphone CCD camera. (Paterson, Raja et al. 2017, Zhang, Pan et al. 2018) Fewer examples, however, refer to the combination of luminescent QR codes with smartphones in which although the emission color is quantified applicability is directed to objects authentication (anti-counterfeiting). (Kennedy, Stephenson et al. 2017, Li, Yao et al. 2017)

In a step forward towards the popularization of luminescent smart QR codes in IoT, here we demonstrate how photographs of luminescent QR codes recorded by a smartphone are used to measure in real-time the absolute temperature in the 283-317 K interval with a relative thermal sensitivity (5.14% K−1) and a temperature resolution (0.194 K) better than those typical of electrical counterparts. Since the decoding tool and temperature sensing require only a CCD camera the mobile phone is used in its original configuration. The thermal dependence of the QR code colour is quantified by the RGB coordinates, whose G/R ratio is used as the thermometric parameter. Moreover, and as an added benefit, the luminescence thermometer based on the G/R ratio is the first example of a primary intramolecular thermometer allowing to predict the temperature through a well-defined equation of state prior to any time-consuming thermal calibration. Luminescence thermometry having become very popular since 2010, particularly due to its enormous potential in micro and nanofluidic, micro and nanoelectronics, photonics and nanomedicine,(Brites, Lima et al. 2012, Jaque and Vetrone 2012, Marciniak, Prorok et al. 2016, Geitenbeek, Prins et al. 2017, Skripka, Benayas et al.

2017, Dramićanin 2018) and its connection to QR codes will open exciting horizons on mobile-based IoT applications.

GENERAL DESCRIPTION

The present technology discloses smart labels based in QR code technology, allowing to measure and register physical parameters, such as temperature and UV exposure, as well as provide traceability and authentication of object/documents/people attached to it, all this using a common camera device without specific features for reading and access the information, with no extra devices required. It proposes the transformation of a passive label (traditional QR code) to an active label able to provide dynamic information acting as a sensor in real-time.

Nowadays to measure physical parameters such as temperature or UV exposure, is necessary to have specific sensors coupled, or connected, to devices able to transform the physical parameter measured into a value of temperature or UV exposure that many times are not easy to use or intuitive to the user.

These sensors are mainly electronic and often must be in contact with the environment that is measuring and under certain conditions, such as in the presence of electromagnetic fields, dangers environments these devices cannot work properly or even be applied.

Optical sensors without electronic components as the one presented here completely avoids such complications or difficulties, as the label is attached to the object, documents or people remaining passive to the environment and measure of temperature and UV exposure at distance using a common camera device with simple processes.

The complexity of electronic sensors is also higher compared to the one presented here that can be created at low-cost by everyone with access to the materials and used without requiring specific and/or expensive equipment's, only a common camera device that is easily available.

Compared to passive labels such as traditional QR codes, that can only display static text with limit storage capacity, the proposed technology can overcome their capacity limitation to store information providing larger space and at the same time is acting as a sensor to monitor physical parameters, improving the existing ones. Although is expect that any physical parameter that influence the color emitted can be measured.

The present technology also provides a mechanism to store secret information with restrict access and at the same time also public access to information providing the opportunity to also do authentication traceability of the object, document or people.

Traditional QR codes are generated using a standard and already available QR code generator that follows the definitions provided by international standards organizations for this technology and are afterwards produced with materials that only when exposed to an excitation source exhibit color. The color and/or pixel intensity changes with temperature variation and/or UV exposure, or other physical parameter that provides a physical/chemical interaction with the materials of the code.

The temperature and UV exposure, or other physical parameters such as humidity, or parameters that provide a physical or chemical change to the emission of the materials, are measured by means of a common camera device, capturing a picture to quantify the color and/or intensity exhibited by the material. As the present technology is expected to be used independently of the camera, and although the camera sensor inbuilt will affect the acquired image quality and resolution, it should not have a direct influence in the obtained values for the physical parameters other than provide more or less accuracy and/or sensitivity in the measure. The device is just an image collecting hardware that quantify the color variation, being expected a high-end quality camera to perform better when compared to low quality one.

For temperature measurements, UV exposure measurements and access to information stored, the color of each material must be activated exposing it to an excitation light source, wherein the material is transparent without that excitation and with that excitation it exhibits a unique and different color from the other materials used. The excitation source wavelength and intensity depend on the material intrinsic characteristics and it can be provided by an external lamp/LED/LASER and/or the sun.

In the case of storing information, different levels of accessibility, restrict or public, are possible due to the previous point, where some information can be kept secret until excited with an adequate radiation source.

The multiplexed luminescent QR codes of the present application are formed by overlapping different layers, composed each one by an individual QR code with different shapes, and produced with a different material.

The reading and decoding of the multiplexed QR code is made by exposing it to specific radiation, a specific wavelength (UV/visible), to retrieve specific information. Since one of the basic features of QR codes is that it can be decoded very fast, this exposure to the excitation source will be also very fast, so it should not affect the measured value for UV exposure.

The QR code messages are decoded using a processing device capable of reading QR code, that in connection with a server/cloud, will store information about the reading process, that can be compared to existing information allowing to proceed with traceability and authentication of the object.

In a step forward towards the popularization of luminescent smart QR codes in IoT (Internet of Things), it is proposed herein that photographs of luminescent QR codes recorded by a common camera device are used to measure temperature and UV exposure, or other physical parameters, in real-time, FIGS. 4 and 5.

The proposed methodology constitutes an innovation in the area, assigning technological value to QR codes and leveraging the area of IoT devices towards smart labels using smartphones without additional components, as there is no need to adapt neither the tag decoding nor the CCD detector for temperature sensing, in which e-health is a target application.

The multiplexed luminescent QR code of the present application is processed/read by a device comprising a camera, which allows to quantify the color and/or pixel intensity by decomposing the image captured by the camera in its RGB components. The RGB components vary with temperature, UV exposure, or other physical parameter that influence the emission of the material of each layer, therefore it is possible to quantify each parameter based on these components obtained using a camera device.

After detection, the image with the QR code processed with the luminescent material is analyzed through any process of patterns/shapes/colors identification, resulting in the definition of the pixels related to the QR code. The ratio of the R, G, and B coordinates intensity of that pixels, which have a dependence with temperature, UV exposure or other physical parameter, can be used to attain an independent quantification of the parameter under analyses (temperature, UV expose, physical parameter).

BRIEF DESCRIPTION OF THE DRAWINGS

The present technology will be further explained with example figures attached where the different materials are represented by different colors.

DETAILED DESCRIPTION

Figure 1:
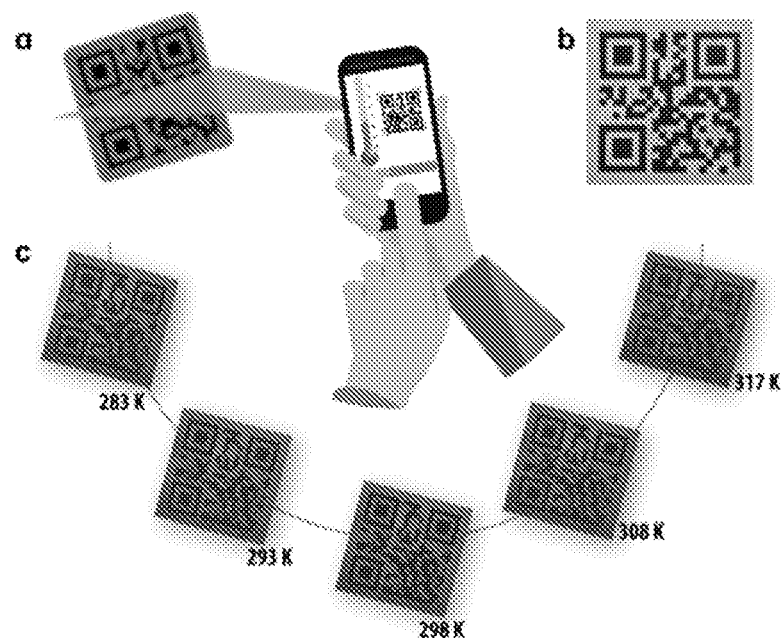
FIG. 1 Photographs of luminescent QR codes at different temperature values. Schematic of the temperature measurement by a conventional smartphone (Charge-coupled device (CCD) camera) based on the quantification of the color exhibited at different temperatures.

The multiplexed luminescent QR codes of the present application are formed by overlapping different layers, composed each one by an individual QR code with different shapes, and produced with a different material.

To have a multiplexed QR code at least two QR code layers are needed, produced with two different materials, and at most to maintain the orthogonality of the color space used the maximum are three QR code layers produced with different materials, and overlapped, being only limited by the detection device capability to recognize the color exhibited and by the minimum physical dimensions necessary to produce the QR code.

The QR codes of the present technology are formed by materials that are sensitive to temperature variation and/or UV exposure, or other physical parameters, not being expected a variation of those parameter due to exposure to visible light. It is expected that other physicals parameters such as humidity, or other parameters capable of changing the emission spectra of the layer materials, which can have implications in the color and/or pixel intensity of the materials, are also able to me monitored by the present technology.

So, the present technology encompasses the enhancement of storage capacity limits, since the different layers comprise different information, and the evolution to a smart label for devices decryption applications.

In one embodiment, the materials of the layers are luminescent materials.

In one embodiment, the materials of the layers are any material (inorganic, organic or organic-inorganic hybrids, nanoparticles, crystals) incorporating any optical center, whose emission properties depend on the physical parameters above mentioned(the example selected in the present document are organic-inorganic hybrids with trivalent europium ($Eu^{3+}$) and terbium ($Tb^{3+}$) ions, whose emission color is thermal—or other physical parameters above mentioned—dependent) were processed as luminescent QR codes with the ability to simultaneously double the storage capacity and sense temperature in real time using a photo taken with the CCD camera of a smartphone.

In one embodiment the material used in the present technology is di-ureasil (600) (d-UPTES (600)) doped with bi-nuclear $Eu0.25Tb0.75(tfac)_3 \cdot H_2O$ complex, wherein tfac is 1,1,1-trifluoro-2,4-pentanedione.

In another embodiment, the materials used for the layers of the multiplexed QR code of the present application are complexes with lanthanide ions, luminescent polymers, luminescent nanoparticles, luminescent micro powders. The materials chosen for the present technology should be transparent and only change color and/or intensity when exposed to the physical parameters herein described.

These materials are capable of changing from transparent to colorful ones because they absorb radiation in the UV/Blue spectral region and downshift this radiation towards de visible and/or near-infrared spectral region through photoluminescence processes (radiative and non-radiative).

If near infrared is used as excitation source downshifting emission in the near infrared spectral region and upconversion emission towards the visible spectral range (non-linear absorption process).

The methods of deposition/printing of the materials in a QR code format are:
(1) dip-coating—immersing a transparent substrate made with a QR code format inside a container with the material of the layer intended to make the code, creating a coating around the substrate. In this case, to obtain the multiplexed QR code of the present application, it is necessary to have more than one substrate, each made with a different code shape;
(2) spin-coating—put a subtract with a QR code format in a rotating machine and apply the material on top of it. The centrifuge force will spread the material across the substrate forming a coating;
(3) Inkjet print—use of an inkjet material printer to print the material in the QR code format onto a substrate.
(4) General film deposition technics known to the skilled person.

The materials used to produce the QR are transparent until irradiated with an excitation source, and at that point the material exhibits a characteristic color.

The reading and decoding of the multiplexed QR code is made by exposing it to specific radiation, a specific wavelength (UV/visible), to retrieve specific information. Since one of the basic features of QR codes is that it can be decoded very fast, this exposure to the excitation source will be also very fast, so it should not affect the measured value for UV exposure.

The excitation source wavelength ranges from UV to visible to infrared depending on the material intrinsic characteristics and can be provided by:
(1) external lamp, LED, LASER;
(2) sun;

In one embodiment, the luminescent QR codes of the present application are capable of revealing different colors at distinct temperature values, as shown in FIG. 1.

Figure 2:
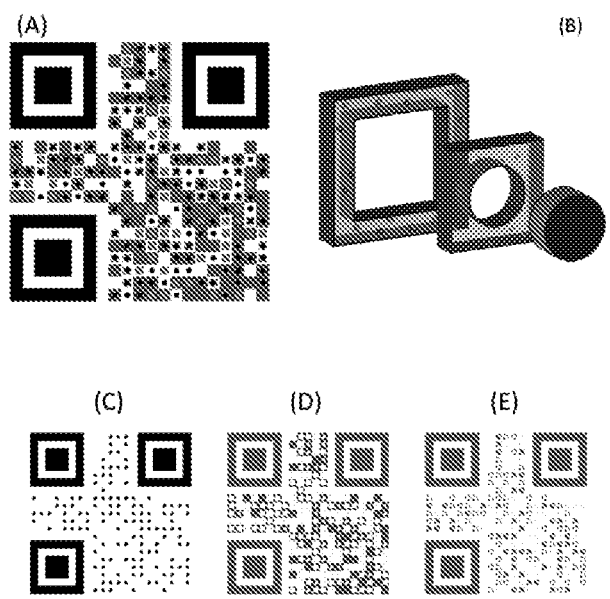
FIG. 2 spectrally and spatially multiplexed Quick Response (QR) codes (A). (B) different patterns used. (C)-(E) different illumination used to access and read the content of each layer.
Figure 3:
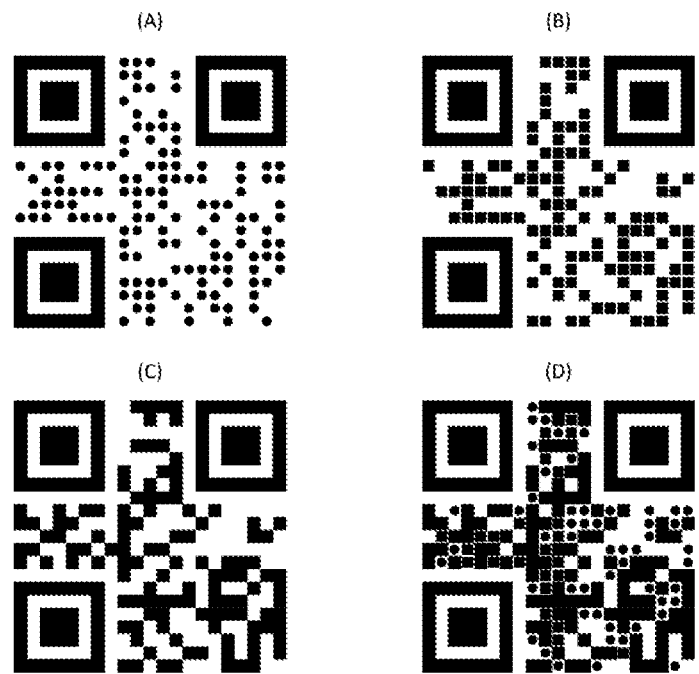
FIG. 3 (A) Illustrative example of a QR code version 1 with dimensions 15×15 cm$^2$ used as first layer with regular module as established in ISO 18004/2001. (B) Illustrative example of a QR code version 1 with dimensions 15×15 cm$^2$ used as second layer with square modules with an area 0.72 smaller than layer 1. (C) Illustrative example of a QR code version 1 with dimensions 15×15 cm$^2$ used as third layer with circle modules with an area 0.44 smaller than layer 1. (D) Illustrative example of a QR code version 1 with dimensions 15×15 cm$^2$ using the QR codes presented in figures (A)-(C).
Figure 4:
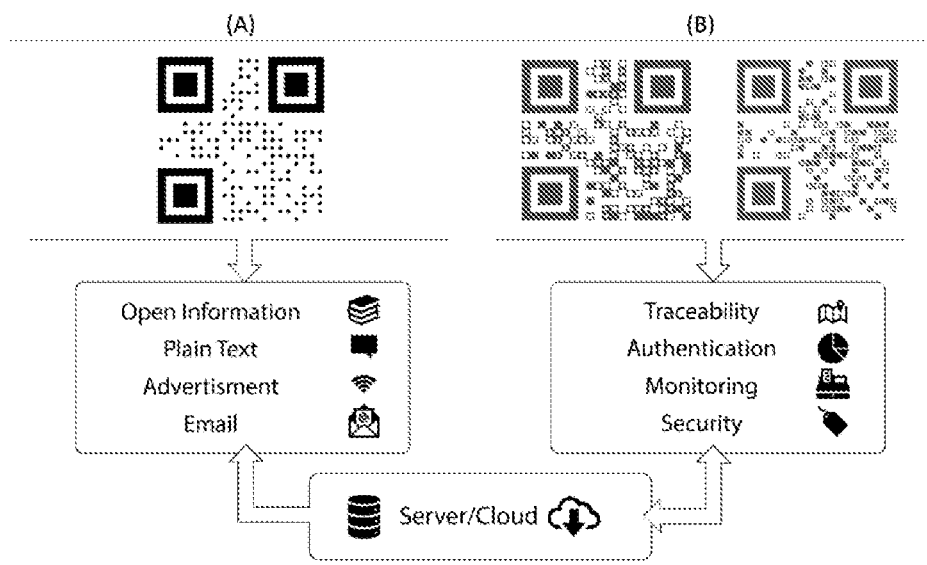
FIG. 4 Illustrative example of (A) public and (B) restrict access based on FIG. 3D, granted using different excitation energies (e.g. (A) solar and (B) UV).
Figure 5:
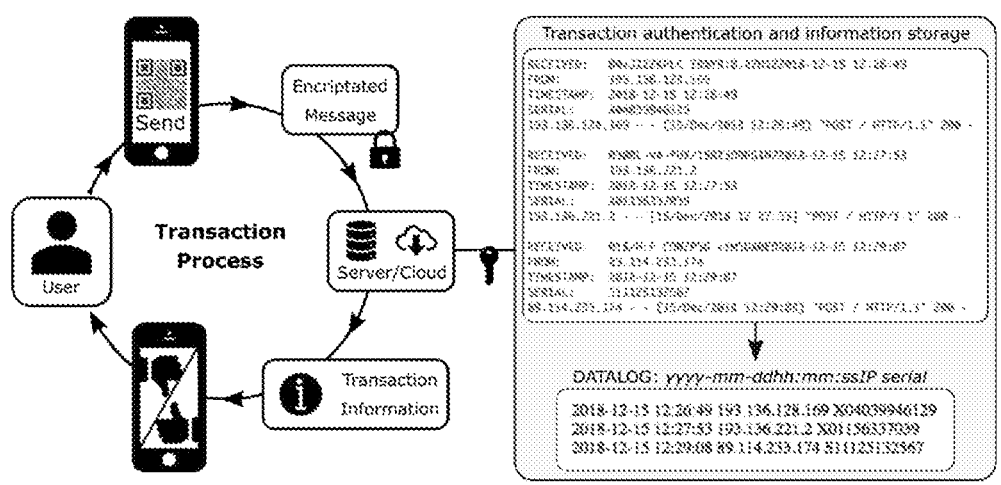
FIG. 5 Traceability and authenticity of the object to which the label is attached to made using a smartphone in connection with a server/could service.

In another embodiment, the luminescent QR codes of the present application are capable of revealing different colors depending on the UV exposure they are subject to, as shown in FIG. 2 (c-e).

EXAMPLES

The developed methodology based on the intensity of the red and green pixels of the photo yielded a maximum relative sensitivity and minimum temperature uncertainty of the QR code sensor of 5.14%·K−1 and 0.194 K, respectively, both at 293 K. As added benefit, the intriguing performance results from an efficient energy transfer involving the thermal coupling between the Tb3+-excited level (5D4) and the low-lying triplet states of organic ligands, being the first example of an intramolecular primary thermometer.

The use of different materials, with different properties lead to different exhibited color, so is predicted a wide range of colors possible to be used, being the color analyse develop in the RGB orthogonal color space for visible emitting QR codes. In the case of near infrared QR codes the image analysis is based on the relative intensity in gray scale.

Example 1

Synthesis of Eu0.25Tb0.75(tfac)3·H2O Complex

The Eu0.25Tb0.75(tfac)3·H2O was synthesized according to the literature [1].

Synthesis of di-ureasil, dU(600), Doped With the Eu0.25Tb0.75(tfac)3·H2O Complex The organic-inorganic hybrid precursor, d-UPTES(600), was prepared according to the literature [2]. In order to get the optimal doping concentration for the QR code fabrication, two doping contents corresponding to the final concentrations in the gels of 0.87 wt % (dU6TbEu-1) and 3.39 wt % (dU6TbEu), were adopted. For synthesis of sol doped with higher concentration of Eu0.25Tb0.75(tfac)3·H2O, typically, 6.0 g (5.484 mmol) of d-UPTES(600) was mixed with 8 mL of EtOH under stirring. Then 168.0 mg of Eu0.25Tb0.75(tfac)3·H2O was added, and the mixture was treated under ultrasonic condition until a clear solution was obtained. Next 0.592 mL of HCl acidified water (pH=2) was added under stirring to catalyse the hydrolysis and condensation reactions. The molar ratio of d-UPTES(600):H2O is 1:6. The resulting sol (dU6EuTb) was stirred at room temperature for further 2 hours and then it was deposited by dip-coating, as detailed below. The resulting materials were characterised by X-ray diffraction (XRD) and Fourier transform infrared (FT-IR) spectroscopy, as detailed in the following section.

Materials

The bi-nuclear $Eu_{0.25}Tb_{0.75}(tfac)_3$·H2O complex (tfac=1,1,1-trifluoro-2,4-pentanedione, Sigma-Aldrich), was synthesized as previously reported, (Ramalho, António et al. 2018). Elemental analyses for C and H were performed with a TruSpec 630-200-200 CNHS Analyser. The doping concentrations of $Eu^{3+}$ and $Tb^{3+}$ were determined by ICP-OES (inductively coupled plasma-optical emission spectroscopy). The analytical results are: calcd. (wt %): C 28.38, H 2.21, Eu 5.99 and Tb 18.80; found (wt %): C 27.97, H 2.24, Eu 5.97 and Tb 18.10. To process the complex as films it was incorporated into a di-ureasil organic-inorganic hybrid host, so-called d-U(600), which is formed by polyether chains (with average molecular weight of 600 gmol-1) covalently linked to a siliceous inorganic skeleton by urea bridges, as previously reported(Brites, Fuertes et al. 2017). The resulting material, hereafter termed as dU6EuTb, was characterized by X-ray diffraction (XRD) and Fourier transform infrared (FT-IR) spectroscopy QR Code Processing Luminescent QR codes version 1 (21×21 modules2) with error correction level L (7% of codewords can be restored by a Reed-Solomon error algorithm) and dimensions 5×5 cm² with the different messages, "SMART LABELLING", "UNIVERSITY OF AVEIRO", and "INST. DE TELECOMUNICACOES", were implemented. Aiming at preparing a luminescent layer, QR codes produced on a 5.0×10⁻⁴ m thickness acetate substrate layer were laser cut (the acetate on the inactive modules region was removed). These QR codes were vertically immersed in a solution of the dU6EuTb (3.39 wt %) at a velocity of 1.4×10⁻³ m.s⁻¹ using a homemade dip-coating system. After the deposition, the substrates with the luminescent QR codes were transferred to an oven at 45° C. for 48 h. The QR codes are transparent under day light, enabling color-based multiplexing. This strategy to multiplex distinct colored QR codes consists in overlapping a conventional black/white QR code by the luminescent QR code. Under daylight the acetate-based luminescent code is transparent, and the base code is readily accessed, whereas under UV illumination the acetate-based QR code becomes luminescent, enabling the color-multiplexing of the overlapped codes.

Optical Characterization

Image acquisition: The photographs of the luminescent QR codes under UV illumination were taken with a smartphone camera with resolution of 2238×3986 pixel², aperture of f/2 and a sensor dimension of 1/4.2".

Luminescent QR Codes

FIG. 1 shows a dU6EuTb-based luminescent QR code at distinct temperature values, revealing different emission color coordinates. The emission is ascribed to the intra-4f6 (Eu3+) and intra-4f8 ($Tb^{3+}$) transitions, whose relative intensity is thermal sensitive. As the temperature is raised from 283 to 323 K, the relative intensity of the 5D4→7F6-3 transitions decreases, whereas that of the 5D0→7F0-4 transitions remains nearly constant. Consequently, the emission color coordinate deviates from the orange (0.578, 0.356) to the red (0.636, 0.234) spectral regions.

This color variation with temperature was also quantified in the RBG color space calculated from photographic records of the luminescent QR codes in the same temperature range, FIG. 2a, taking advantage of the ability of the smartphone CCD camera that simultaneously allows the QR code reading (decryption) and the photo acquisition for further processing and temperature sensing, through the quantification of the RGB color coordinates of the image avoiding the need of a spectrometer to record emission spectra.

In this example, photographs taken with the CCD camera of a mobile phone enable the temperature readout with a maximum relative sensitivity and a minimum uncertainty of 5.14%·K⁻¹ and 0.194 K, respectively, both at 293 K. These figures of merit result from the thermal coupling between the 5D4 $Tb^{3+}$ excited level and the low-lying triplet states of the organic ligands and are among the best ones known for luminescent thermometers. The ratio between the intensity of the green and red pixels of the photos are the basis for the temperature sensing through a unique intramolecular primary thermometer opening the possibility for the implementation of QR codes in mobile IoT without the need of any technological adaptation of current smartphones.

This is the first example in which smartphones are used as an effective alternative to portable spectrometers to calculate the temperature using the induced color temperature change. The methodology constitutes an innovation in the area, assigning technological value to the QR codes and leveraging the area of IoT devices towards smart labels using a smartphone in its original configuration, as there is no need to adapt neither the tag decoding nor the CCD detector for temperature sensing, in which e-health is a target application. Additional features are envisaged to the luminescent QR codes (e.g. traceability, data storage and security alerts) through dedicated applications, that establish connections and information exchanging between the QR code reader and the cloud, in which the encrypting connection may appear as an optional tool.

Emission Spectra and Temperature Calibration

The temperature-dependent emission spectra of the QR codes were measured using a portable spectrometer (Ocean-Optics Maya 2000 Pro) coupled with an optical fiber, under a UV lamp excitation (254 nm). The QR code response to temperature was calibrated using either the emission spectra or the smartphone photographic records of the codes. For calibration, a homemade Peltier-plate based temperature controller and a K-type thermocouple were used. The temperature was set in the temperature controller and the QR code was let to thermalize for 5 minutes to ensure a constant temperature value reading in the thermocouple. An emission spectrum (integration time of 1.0 s, recorded at a central location of the code) and a photograph of the whole code were collected using the portable spectrometer and the smartphone's camera, respectively. The procedure was repeated in the 283-323 K range (step of 1 K). To independently monitor the temperature attesting its uniformity within the QR code surface, a thermographic camera FLIR DGOO1U-E (sensitivity of 0.1 K, accuracy of ±2 K, according to the manufacturer) was used. The IR camera temperature profiles result from an averaging of four thermal images acquired in distinct regions of the QR code (Figure S3, Supporting Information). To estimate the dU6EuTb layer emissivity (ε) we adopted the procedure described elsewhere,(Ramalho, António et al. 2018) resulting ε=0.85. The emission colour coordinates were calculated from the emission spectra using the 1931 Commission Internationale de Éclairage (CIE) methodology defined for the $2^{nd}$ standard, whereas the colour coordinates from the photographs were determined using the RGB model (Supporting Information for details).

Photoluminescence

The emission and the excitation spectra were recorded at 300 K using a modular double grating excitation spectrofluorimeter with an emission monochromator (Fluorolog-3 2-Triax, Horiba Scientific) coupled to a photomultiplier (R928 Hamamatsu), using the front face acquisition mode. The excitation source was a 450 W xenon arc lamp. The excitation spectra were weighed for the spectral distribution of the lamp intensity using a photodiode reference detector. The absolute emission quantum yields were measured at room temperature using a system (Quantaurus-QY Plus C13534, Hamamatsu) with a 150 W xenon lamp coupled to a monochromator for wavelength discrimination, an integrating sphere as the sample chamber, and a multichannel analyzer for signal detection. The method is accurate to within 10%.

RGB color model

The RGB color model is an additive model that creates color through the mix of three primaries colors Red, Green and Blue. Based on this every image can be decomposed into that three channel, one corresponding to each primary being possible afterwards to determine the mean value for each channels (μR,G,B) using an histogram fitted whit a Gaussian function and their associated error defined by the standard error of the mean, Eq. 1.

$$\mu_{R,G,B,} = \frac{\sigma_{R,G,B}}{\sqrt{n}} \qquad (1)$$

where n is the sample number of points and σR,G,B is the standard deviation of each fit.

The R, G and B values were normalized using Eq. 2.

$$r = \frac{R}{R+G+B}; g = \frac{G}{R+G+B}; b = \frac{B}{R+G+B} \qquad (2)$$

Lisbon,

The invention claimed is:

1. A multiplexed luminescent QR code comprising at least two layers, composed each by an individual QR code with different shapes, configured to act as a sensor to monitor physical parameters that influence a layer material properties of the at least two layers, and store information, wherein at least one of a color and a pixel intensity of the code changes when exposed to physical parameters, and wherein the multiplexed luminescent QR code is processed when exposed to a specific radiation source and by a device comprising a camera comprising photographic or video recording capabilities.

2. The multiplexed luminescent QR code according to claim 1, wherein each layer is composed by a different luminescent material.

3. The multiplexed luminescent QR code according to claim 1, wherein the layer material is lanthanide ions, luminescent polymers, luminescent nanoparticles, or luminescent micro powders.

4. The multiplexed luminescent QR code according to claim 1, wherein the layer material is organic-inorganic hybrid materials doped with trivalent europium ($Eu^{3+}$) and terbium ($Tb^{3+}$) ions.

5. The multiplexed luminescent QR code according to claim 1, wherein the layer material is di-ureasil (600) doped with bi-nuclear Eu0.25Tb0.75(1,1,1-trifluoro-2,4-pentanedione)3·H2O complex.

6. The multiplexed luminescent QR code according to claim 1, wherein each of the individual QR code with different shapes overlap.

7. The multiplexed luminescent QR code according to claim 1, wherein the physical parameters are temperature, UV exposure, humidity.

8. The multiplexed luminescent QR code according to claim 1, wherein a layer of the at least two layers changes from transparent to color upon exposure to an excitation source.

9. The multiplexed luminescent QR code according to claim 1, wherein the multiplexed luminescent QR code is made by dip-coating, spin-coating, inkjet print or other film deposition technics.

* * * * *